(12) United States Patent  (10) Patent No.: US 12,306,300 B2
Seo et al.  (45) Date of Patent: May 20, 2025

(54) SYSTEM FOR OBSERVING OBJECT BY USING HOLOGRAM OPTICAL ELEMENT

(71) Applicant: LG Chem, Ltd., Seoul (KR)

(72) Inventors: Dae Han Seo, Daejeon (KR); Bu Gon Shin, Daejeon (KR); Chang Yoon Lim, Daejeon (KR); Soyoung Choo, Daejeon (KR); Hyunjoo Son, Daejeon (KR)

(73) Assignee: LG Chem, Ltd., Seoul (KR)

( * ) Notice: Subject to any disclaimer, the term of this patent is extended or adjusted under 35 U.S.C. 154(b) by 206 days.

(21) Appl. No.: 18/008,751

(22) PCT Filed: Oct. 19, 2021

(86) PCT No.: PCT/KR2021/014600
§ 371 (c)(1),
(2) Date: Dec. 7, 2022

(87) PCT Pub. No.: WO2022/086130
PCT Pub. Date: Apr. 28, 2022

(65) Prior Publication Data
US 2023/0213650 A1  Jul. 6, 2023

(30) Foreign Application Priority Data
Oct. 19, 2020 (KR) .................. 10-2020-0135094
Oct. 19, 2021 (KR) .................. 10-2021-0139197

(51) Int. Cl.
*G01S 17/04* (2020.01)
*G02B 5/32* (2006.01)

(52) U.S. Cl.
CPC ............... *G01S 17/04* (2020.01); *G02B 5/32* (2013.01)

(58) Field of Classification Search
CPC .................................. G01S 17/04; G02B 5/32
See application file for complete search history.

(56) References Cited

U.S. PATENT DOCUMENTS 5,138,489 A  8/1992  Paek
5,785,347 A  7/1998  Adolph et al.
(Continued)

FOREIGN PATENT DOCUMENTS

CN  103988062 A  8/2014
CN  111751987 A  10/2020
(Continued)

OTHER PUBLICATIONS

Extended European Search Report including Written Opinion for Application No. 21883199.8 dated Nov. 24, 2023, pp. 1-10.
(Continued)

*Primary Examiner* — Dani Fox
*Assistant Examiner* — Fani Polyzos Boosalis
(74) *Attorney, Agent, or Firm* — Lerner David LLP

(57) ABSTRACT

A system for observing an object by using a hologram optical element is disclosed herein. In some embodiments, a system for observing an object includes an infrared (IR) light source for emitting infrared light, a hologram optical element (HOE) including an optical element film, wherein the optical element film for reflecting and diffracting the emitted infrared light, wherein infrared light of a specific wavelength from among the emitted infrared light emitted is reflected towards the object, and an IR light detector for detecting the infrared light of a specific wavelength reflected from the object.

8 Claims, 4 Drawing Sheets

(56) References Cited

U.S. PATENT DOCUMENTS

| | | | |
|---|---|---|---|
| 5,946,114 A | 8/1999 | Loiseaux et al. | |
| 6,356,854 B1 | 3/2002 | Schubert et al. | |
| 6,885,484 B2 * | 4/2005 | Kasai | G02B 5/32 |
| | | | 359/22 |
| 7,330,124 B2 | 2/2008 | Ota | |
| 9,443,358 B2 | 9/2016 | Breed | |
| 9,470,826 B2 | 10/2016 | Tseng et al. | |
| 9,558,663 B2 | 1/2017 | Breed | |
| 9,593,521 B2 | 3/2017 | Breed | |
| 9,595,139 B1 | 3/2017 | Breed et al. | |
| 9,652,984 B2 | 5/2017 | Breed | |
| 9,666,071 B2 | 5/2017 | Breed | |
| 9,691,188 B2 | 6/2017 | Breed et al. | |
| 9,701,265 B2 | 7/2017 | Breed | |
| 9,997,068 B2 | 6/2018 | Breed | |
| 10,051,411 B2 | 8/2018 | Breed | |
| 10,118,576 B2 | 11/2018 | Breed | |
| 10,240,935 B2 | 3/2019 | Breed | |
| 10,274,655 B2 | 4/2019 | Tseng | |
| 10,358,057 B2 | 7/2019 | Breed | |
| 10,573,093 B2 | 2/2020 | Breed | |
| 2001/0024032 A1 | 9/2001 | Breed et al. | |
| 2003/0148192 A1 | 8/2003 | Ashizaki et al. | |
| 2004/0047058 A1 | 3/2004 | Unno et al. | |
| 2005/0051729 A1 | 3/2005 | Chrisp | |
| 2008/0123908 A1 | 5/2008 | Waldman et al. | |
| 2014/0291527 A1 | 10/2014 | Okudo et al. | |
| 2014/0314123 A1 | 10/2014 | Schilz et al. | |
| 2016/0138976 A1 | 5/2016 | Schilz et al. | |
| 2016/0195430 A1 | 7/2016 | Sticherling | |
| 2017/0356800 A1 | 12/2017 | Krishnan et al. | |
| 2019/0054874 A1 | 2/2019 | Breed | |
| 2019/0141467 A1 | 5/2019 | Breed | |
| 2019/0293485 A1 | 9/2019 | Okumura et al. | |
| 2020/0278243 A1 | 9/2020 | Nagaya et al. | |
| 2020/0394400 A1 | 12/2020 | Tornéus | |
| 2022/0057258 A1 | 2/2022 | Wheatley et al. | |

FOREIGN PATENT DOCUMENTS

| | | |
|---|---|---|
| DE | 102004021368 A1 | 11/2005 |
| EP | 1043682 A1 | 10/2000 |
| EP | 2801867 A1 | 11/2014 |
| JP | H0597482 A | 4/1993 |
| JP | H07020318 A | 1/1995 |
| JP | H109501120 A | 2/1997 |
| JP | 2904678 B2 | 6/1999 |
| JP | 2002-123162 A | 4/2002 |
| JP | 3432235 B2 | 8/2003 |
| JP | 2004-058799 A | 2/2004 |
| JP | 2005-247014 A | 9/2005 |
| JP | 2006252138 A | 9/2006 |
| JP | 3925222 B2 | 6/2007 |
| JP | 4535352 B2 | 9/2010 |
| JP | 2011-109276 A | 6/2011 |
| JP | 2016534343 A | 11/2016 |
| JP | 2019168264 A | 10/2019 |
| KR | 20000052673 A | 8/2000 |
| KR | 200247612 Y1 | 10/2001 |
| KR | 10-2002-0077497 A | 10/2002 |
| KR | 100330109 B1 | 11/2002 |
| KR | 20140126249 A | 10/2014 |
| TW | 201721188 A | 6/2017 |
| TW | 201807384 A | 3/2018 |
| TW | 201810477 A | 3/2018 |
| WO | 200062267 A1 | 10/2000 |

OTHER PUBLICATIONS

International Search Report for Application No. PCT/KR2021/014600 mailed Jan. 28, 2022, pp. 1-3.

* cited by examiner

SYSTEM FOR OBSERVING OBJECT BY USING HOLOGRAM OPTICAL ELEMENT

CROSS-REFERENCE TO RELATED APPLICATION

This application is a national phase entry under 35 U.S.C. § 371 of International Application No. PCT/KR2021/014600, filed on Oct. 19, 2021, which claims priority from Korean Patent Application No. 10-2020-0135094, filed on Oct. 19, 2020, and Korean Patent Application No. 10-2021-0139197, filed on Oct. 19, 2021, the entire contents of which are incorporated by reference herein.

TECHNICAL FIELD

The present disclosure relates to a system for observing an object by using a hologram optical element (HOE), and more particularly, to a system for observing an object by using a hologram optical element that reflects light of a specific wavelength of infrared light.

DESCRIPTION OF THE RELATED ART

In recent years, infrared (IR) light source and sensors have been used to check whether there is a person in the driver seat of a vehicle. The IR light source may be directly irradiated to the driver and the sensor may then detect reflected or scattered light from the driver to determine whether the driver is in the vehicle.

Here, the IR light source may mainly use a light emitting diode (LED) having a wavelength band including a wavelength of about 850 nm. However, the LED has a wide wavelength spectrum, and the driver may thus see a red light, which may obstruct the driver's view while the driver drives the vehicle. The above problem may be solved by reflecting only light of a specific wavelength and transmitting this light indirectly to the driver rather than transmitting the IR light source directly to the driver.

To this end, it is necessary to develop a system for observing an object, which does not obstruct the driver's view by using a hologram optical element including an optical element film that transmits light of some wavelengths among the light irradiated from the IR light source and reflects light of the other wavelengths.

The above information disclosed in this Background section is only for enhancement of understanding of the background of the disclosure, and therefore it may contain information that does not form the prior art that is already known in this country to a person of ordinary skill in the art.

SUMMARY OF THE INVENTION

Technical Problem

An exemplary embodiment of the present disclosure provides a system for observing an object by using a hologram optical element, which does not obstruct a driver's view by reflecting only light of a specific wavelength of an infrared (IR) light source from the hologram optical element.

Technical Solution

According to an exemplary embodiment of the present disclosure, a system for observing an object includes: an infrared (IR) light source emitting infrared light; a hologram optical element (HOE) including an optical element film reflecting and diffracting the infrared light of a specific wavelength among the infrared light emitted from the IR light source toward the object; and an IR light detector detecting the infrared light of a specific wavelength, reflected from the object.

The optical element film may include a base layer, an HOE record layer stacked on one surface of the base layer, and reflecting and diffracting the infrared light of a specific wavelength among the infrared light incident through the base layer, and a protection layer stacked on one surface of the HOE record layer, and protecting the HOE record layer.

The optical element film may reflect the infrared light of a specific wavelength in a range of 660 nm to 1510 nm.

The optical element film may preferably reflect the infrared light of a specific wavelength in a range of 845 nm to 855 nm or 935 nm to 945 nm.

A diffraction angle of the optical element film may be set in a range of 20° or more, 30° or more or 40° or more, in a range of 85° or less, 80° or less or 75° or less, or in a range of 20° to 85°. The diffraction angle of the optical element film may preferably be set in a range of 30° to 85°. The diffraction angle of the optical element film may more preferably be set in a range of 40° to 85°.

Diffraction efficiency of the optical element film may be expressed as a ratio of intensity of the infrared light (D) diffracted from the optical element film to intensity (I) of the infrared light incident on the optical element film, and is set to 30% or more.

The diffraction efficiency of the optical element film may preferably be set to 60% or more, 70% or more, 75% or more or 80% or more.

The IR light source may be disposed to allow the infrared light to be incident on the hologram optical element at an incidence angle of −15° to +15°.

The object may be positioned in the range of the diffraction angle of the optical element film, and the IR light detector may be disposed to face the object to detect the infrared light of a specific wavelength, reflected from the object.

Advantageous Effects

According to an exemplary embodiment of the present disclosure, it is possible to prevent the driver's view from being obstructed by reflecting only the light of a specific wavelength among the light incident from the IR light source toward the driver.

Another effect which may be obtained or predicted by an embodiment of the present disclosure is disclosed directly or implicitly in the detailed description of an embodiment of the present disclosure. That is, various effects predicted based on an embodiment of the present device are disclosed in the detailed description described below.

DETAILED DESCRIPTION OF THE EMBODIMENTS

Figure 1:
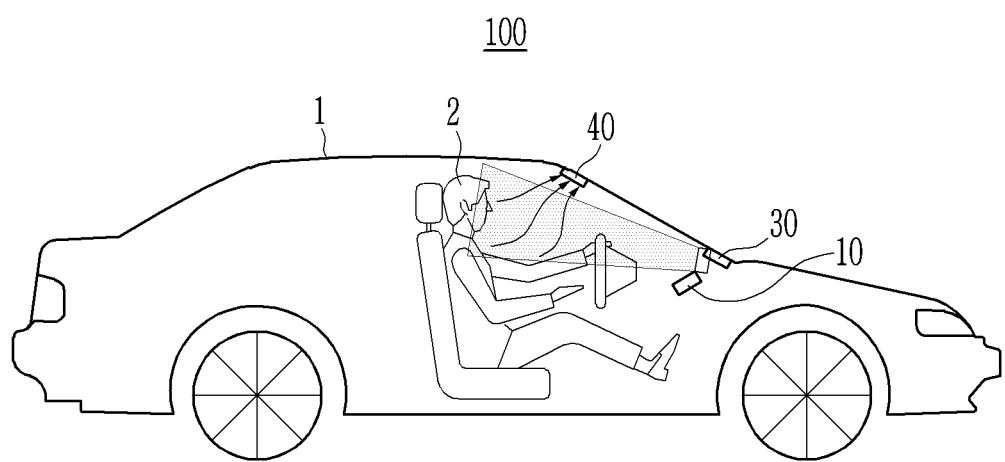
FIG. 1 is a view schematically showing a system for observing an object by using a hologram optical element according to an exemplary embodiment of the present disclosure.

Hereinafter, exemplary embodiments of the present disclosure will be described in detail with reference to the accompanying drawings so that those skilled in the art to which the present disclosure pertains may easily practice the present disclosure. The present disclosure will be described more fully hereinafter with reference to the accompanying drawings, in which exemplary embodiments of the present disclosure are shown. The present disclosure may be modified in various different forms, and is not limited to embodiments provided in the present specification.

In addition, in several exemplary embodiments, components having the same configuration will be representatively described using the same reference numerals in an exemplary embodiment, and only components different from those of an exemplary embodiment will be described in the other exemplary embodiments.

It should be understood that the drawings are schematic and not drawn to scale. The size and proportion of a component in the drawings are shown relatively exaggerated or reduced in size in order to clearly and easily explain the drawings. This arbitrary size is only illustrative and not limitative. In addition, the same reference numeral is used to denote a similar feature of the same structure, element or part shown in two or more drawings. When it is described that an element is referred to as being "on" or "above" another element, it is to be understood that the element may be directly "on" another element or "above" another element including other elements therebetween.

An exemplary embodiment of the present disclosure may specifically describe one embodiment of the present disclosure. As a result, diagrams may be variously modified. Accordingly, the exemplary embodiment is not limited to a specific shape of the illustrated portion, and may include, for example, a shape modified when produced.

Hereinafter, a system for observing an object by using a hologram optical element (HOE) according to an exemplary embodiment of the present disclosure is described in detail with reference to the accompanying drawings.

Figure 2:
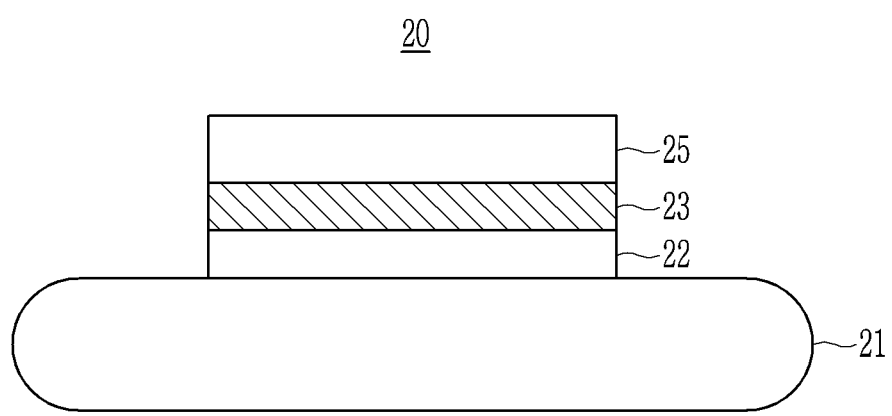
FIG. 2 is a view schematically showing a stacked structure of an optical element film included in the hologram optical element according to an exemplary embodiment of the present disclosure.

FIG. 1 is a view schematically showing the system for observing an object by using a hologram optical element according to an exemplary embodiment of the present disclosure; and FIG. 2 is a view schematically showing a stacked structure of an optical element film included in the hologram optical element according to an exemplary embodiment of the present disclosure.

Referring to FIG. 1, a system 100 for observing an object by using a hologram optical element according to an exemplary embodiment of the present disclosure may include an infrared (IR) light source 10, a hologram optical element 30 and an IR light detector 40.

The IR light source 10 may be disposed on a side in a vehicle body 1 to emit infrared light toward the hologram optical element 30. In addition, the hologram optical element 30 may be disposed under a vehicle window at a front side in the vehicle body 1. The IR light source 10 may be installed to emit infrared light from the side in the vehicle body 1 toward the hologram optical element 30 disposed at the front side inside of the vehicle body 1. In an exemplary embodiment, the IR light source 10 may be disposed to allow the infrared light to be incident on the hologram optical element 30 at an incidence angle of about −15° to about +15°.

The hologram optical element 30 may include an optical element film 20, and the optical element film 20 may reflect infrared light of a specific wavelength, incident from the IR light source 10. Here, the specific wavelength of the infrared light reflected from the optical element film 20 may be in a range of about 660 nm to about 1510 nm, and may preferably be in a range of about 845 nm to about 855 nm or about 935 nm to about 945 nm.

The IR light detector 40 may detect the infrared light of a specific wavelength, reflected from the hologram optical element 30. The IR light detector 40 may be disposed on an upper portion of the vehicle window at the front side in the vehicle body 1. The infrared light emitted from the IR light source 10 may be incident on the optical element film 20 of the hologram optical element 30, and the infrared light of a specific wavelength, reflected from the optical element film 20 may be incident toward an object (or driver) 2. In addition, the infrared light of a specific wavelength, reflected from the object 2, may be detected by the IR light detector 40 to determine whether the object 2 is present in the vehicle. The IR light detector 40 may be an IR camera.

FIG. 2 is a view schematically showing a stacked structure of an optical element film included in the hologram optical element according to an exemplary embodiment of the present disclosure.

Referring to FIG. 2, the optical element film 20 may include a base layer 22, an HOE record layer 23 and a protection layer 25. The base layer 22 may be made of an optically-transparent polymer material, and may be an optical adhesive layer of silicon optically clear adhesive (OCA). The base layer 22 may be disposed on (one surface of) an optical plate 21. The optical plate 21 is not limited thereto, and may be an optical lens or an optical waveguide plate. The infrared light emitted from the IR light source 10 may be incident on the base layer 22 through the optical plate 21 and then transmitted to the HOE record layer 23.

The HOE record layer 23 may be stacked on (one surface of) the base layer 22, and may reflect the infrared light of a specific wavelength. The wavelength of the infrared light reflected from the HOE record layer 23 may be in the range of about 660 nm to about 1510 nm, and may be in the range of about 845 nm to about 855 nm or about 935 nm to about 945 nm.

The HOE record layer 23 may have a thickness of about 3 μm to about 50 μm, preferably about 8 μm to about 15 μm.

The protection layer 25 may be stacked on (one surface of) the HOE record layer 23, and may be a single layer or multiple layers having an anti-reflection function, an anti-moisture permeation function or both the functions to protect the HOE record layer 23. The protection layer 25 may be made of the optically-transparent polymer material, and may be an anti-reflection film.

Figure 3:
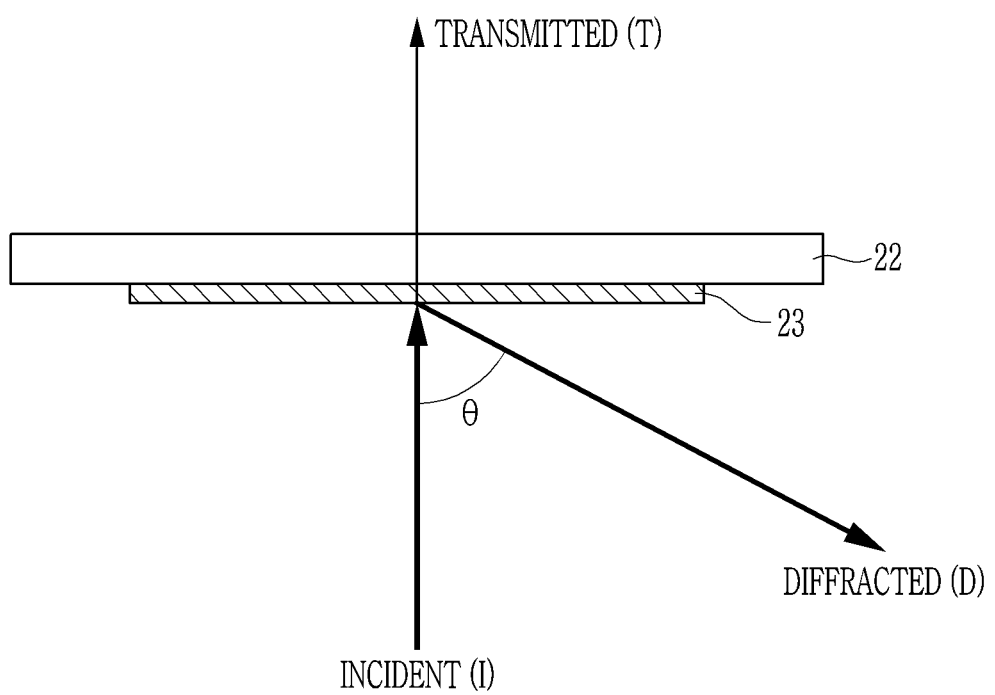
FIG. 3 is a view schematically showing light transmitted and diffracted after being incident on the optical element film according to an exemplary embodiment of the present disclosure.
Figure 4:
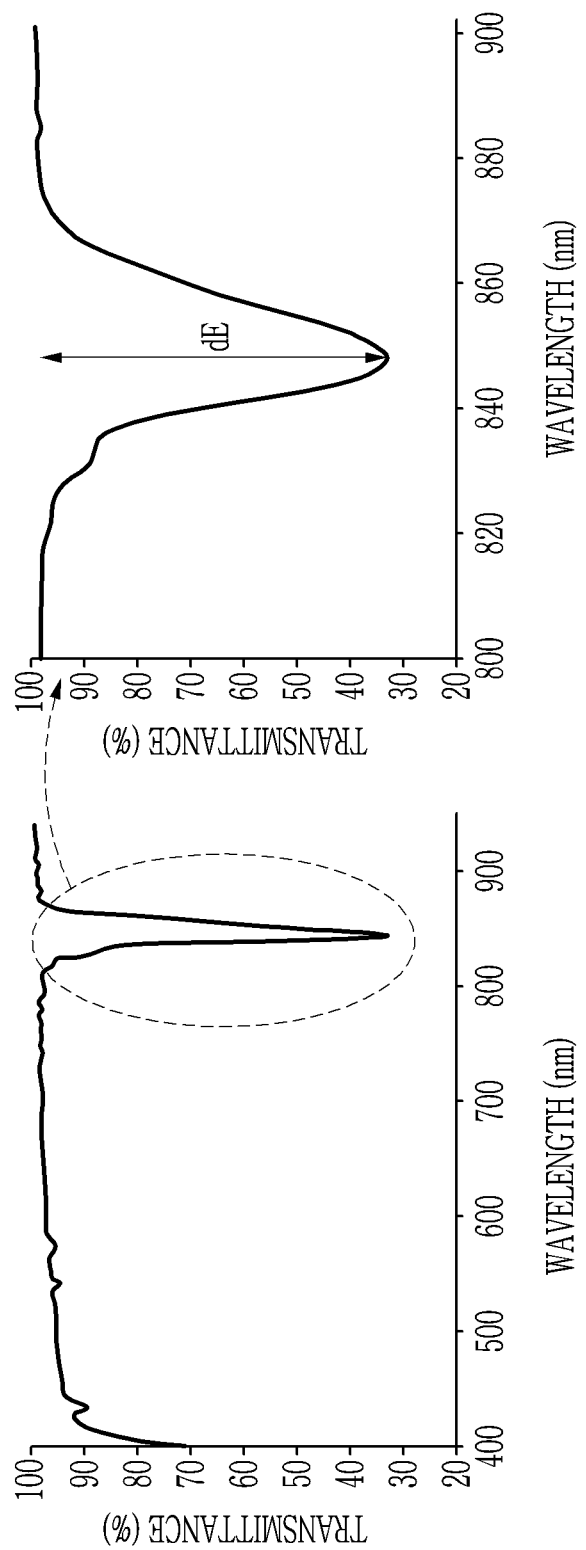
FIG. 4 shows a graph derived by an experiment in which the transmittance and diffraction efficiency of the optical element film according to an exemplary embodiment of the present disclosure is obtained using a spectrometer.

FIG. 3 is a view schematically showing light transmitted and diffracted after being incident on the optical element film according to an exemplary embodiment of the present disclosure; and FIG. 4 shows a graph derived by an experiment in which the transmittance and diffraction efficiency of the optical element film according to an exemplary embodiment of the present disclosure is obtained using a spectrometer.

Referring to FIG. 3, a portion of the infrared light (I) incident on the optical element film 20 may be transmitted (T), and a portion thereof may be diffracted (D). A portion of the light (I) incident from the HOE record layer 23 may be diffracted and a diffraction angle (θ) may be set in a range of 20° or more, 30° or more or 40° or more, in a range of 85° or less, 80° or less or 75° or less, or in a range of 20° to 85°. The diffraction angle (θ) of the optical element film may preferably be set in a range of 30° to 85°. The diffraction angle (θ) of the optical element film may more preferably be set in a range of 40° to 85°. The object 2 may be positioned in the range of the diffraction angle (θ).

In addition, the incidence angle of the light (I) incident to the optical element film 20 may be in a range of about −15° to about +15°. Here, the incidence angle of the light (I) incident to the optical element film 20 may refer to an angle between a normal line of a surface of the optical element film 20 to which the light (I) is incident and the incident light (I).

In addition, referring to FIG. 4, it may be seen that the transmittance is low mainly when the wavelength of the light incident to the optical element film 20 may be about 850 nm, and a wavelength range of the light reflected from the optical element film 20 may be about 845 nm to about 855 nm. The infrared light having the wavelength range of about 845 nm to about 855 nm, may be a main wavelength which is used to observe the object and which does not obstruct the driver's view.

In this wavelength range, diffraction efficiency (dE) of the optical element film 20 may be expressed as a ratio of intensity of the infrared light (D) diffracted from the optical element film 20 to intensity (I) of the infrared light incident on the optical element film 20.

Referring to FIG. 4, it may be confirmed that the transmittance in the wavelength range of about 850 nm is about 35% when the intensity (I) of the infrared light incident on the optical element film 20 is 100%. Therefore, it is shown that the diffraction efficiency (dE) of the optical element film 20 is about 65%. In an exemplary embodiment, the diffraction efficiency of the optical element film 20 may be set to about 30% or more for the object 2 to be detected by the IR light detector 40. The diffraction efficiency of the optical element film 20 may preferably be set to about 60% or more. The diffraction efficiency of the optical element film 20 may more preferably be set to about 60% or more, 70% or more, 75% or more or 80% or more.

As set forth above, according to an exemplary embodiment of the present disclosure, the system for observing an object by using the hologram optical element may prevent the driver's view from being obstructed by reflecting only the light of a specific wavelength incident from the IR light source toward the driver.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A system for observing an object, the system comprising:
   an infrared (IR) light source for emitting infrared light;
   a hologram optical element (HOE) including an optical element film, wherein the optical element film is for reflecting and diffracting the emitted infrared light, wherein infrared light of a specific wavelength from among the emitted infrared light is reflected towards the object; and
   an IR light detector for detecting the infrared light of a specific wavelength reflected from the object,
   wherein the optical element film comprises: a base layer, an HOE record layer disposed on the base layer, the HOE record layer is for reflecting and diffracting the infrared light of a specific wavelength from among the emitted infrared light incident on the HOE record layer through the base layer, and a protection layer disposed on the HOE record layer.

2. The system of claim 1, wherein
   the infrared light of a specific wavelength is in a range of 660 nm to 1510 nm.

3. The system of claim 2, wherein
   the infrared light of a specific wavelength is in a range of 845 nm to 855 nm, or 935 nm to 945 nm.

4. The system of claim 1, wherein
   a diffraction angle of the optical element film is in a range of 40° to 85°.

5. The system of claim 4, wherein
   the object is positioned in the range of the diffraction angle of the optical element film, and
   wherein the IR light detector is disposed to face the object to detect the infrared light of a specific wavelength reflected from the object.

6. The system of claim 1, wherein
   a diffraction efficiency of the optical element film,
   expressed as a ratio of intensity of the infrared light (D) diffracted from the optical element film to intensity (I) of the infrared light incident on the optical element film, is 30% or more.

7. The system of claim 6, wherein
   the diffraction efficiency of the optical element film is 60% or more.

8. The system of claim 1, wherein
   the IR light source is disposed such that the infrared light is incident on the hologram optical element at an incidence angle of −15° to +15°.

* * * * *